Figure 1:
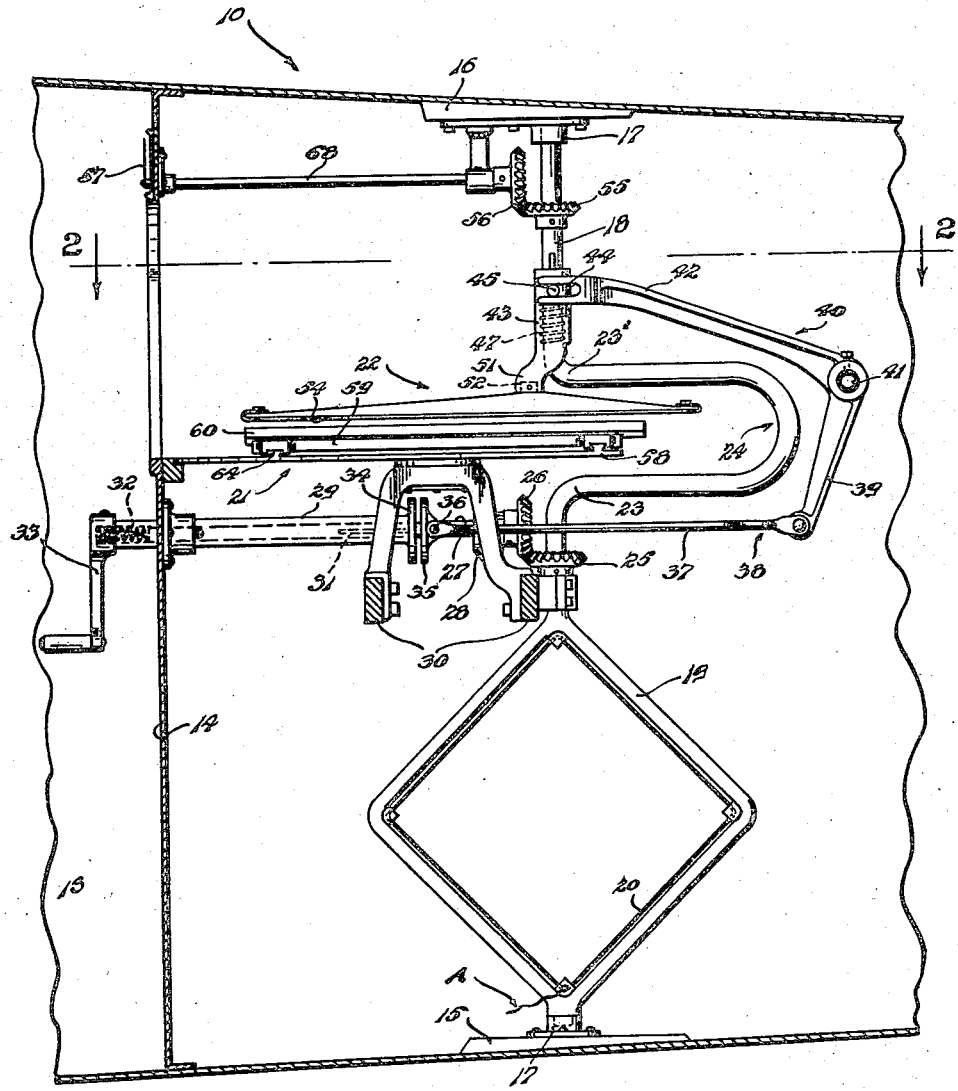

Sept. 4, 1934.   J. M. MACK   1,972,388
RADIO TELEPHONY NAVIGATING APPARATUS
Filed Nov. 19, 1929   3 Sheets-Sheet 2

INVENTOR
James M. Mack
BY
Edward E. Barnes
ATTORNEY

Sept. 4, 1934.  J. M. MACK  1,972,388

RADIO TELEPHONY NAVIGATING APPARATUS

Filed Nov. 19, 1929   3 Sheets-Sheet 3

INVENTOR
James M. Mack
BY
Edward E. Barnes
ATTORNEY

Patented Sept. 4, 1934

1,972,388

UNITED STATES PATENT OFFICE 1,972,388

RADIO-TELEPHONY NAVIGATING APPARATUS

James M. Mack, Houghton, Wash.

Application November 19, 1929, Serial No. 408,181

7 Claims. (Cl. 250—11)

This invention relates to a radio pilot, being applicable, generally, to all types of navigation and especially to aeronautics, the language hereinafter, for ease of description, having particular reference to the latter.

The object, generally stated, is the provision of apparatus of this character which is peculiarly effective to the ascertainment of the exact location reached at any period during an air-craft's progress, in such way facilitating not only the directive control of the plane, but providing a gauge of the distance to which the destination is removed.

Further and more specific objects and advantages of the invention will appear throughout the description of the illustrated embodiment of the invention and the claims annexed thereto.

Generally speaking, the invention consists in a rotatable radio aerial combined with novel structure in a manner adaptable to chart reading of known broadcasting stations previously allocated by a map of the flying vicinity.

As will be hereinafter more fully described in detail, an operator in providing means of indicating a true line through any two points may graph the same to provide an intersecting point common to both. Applicant has recognized the heretofore known principle utilized in aviation and elsewhere, namely that a rotatable loop aerial will impart through its receiving set the strongest response at that position of its rotation wherein the aerial is disposed to have a plane taken through opposite sides in direct alignment to the station being received. Such proceedure has been heretofore used mainly in overcoming to a certain extent the commonly termed "blind flying" by an operator's tuning the receiving set to bring in a station located in relatively close proximity to the destination, rotatably adjusting the aerial to "line up" on the same, and holding the nose of the craft in alignment with such plane of aerial.

With the above controlling conception in mind, the invention further consists in the novel construction, adaptation and combination of parts, hereinafter described and claimed.

In the drawings, wherein the now preferred structural embodiment of the invention is illustrated in its disposition forward of the cock-pit of an air-plane.

Figure 3:
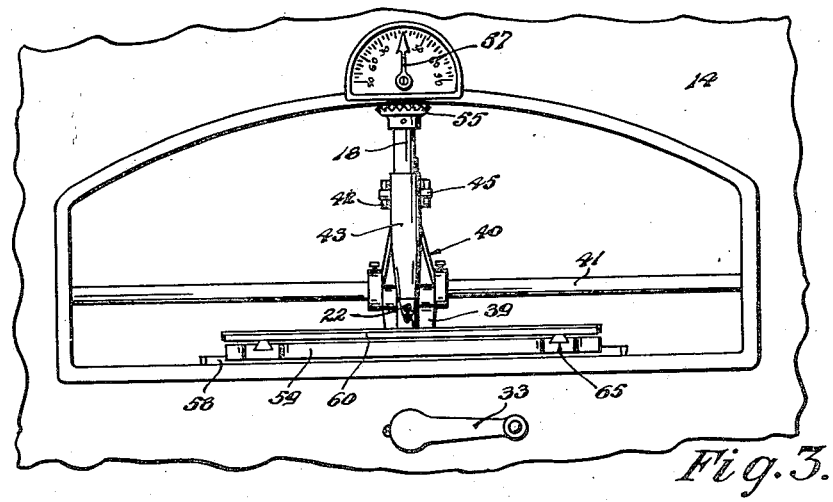
Figure 2:
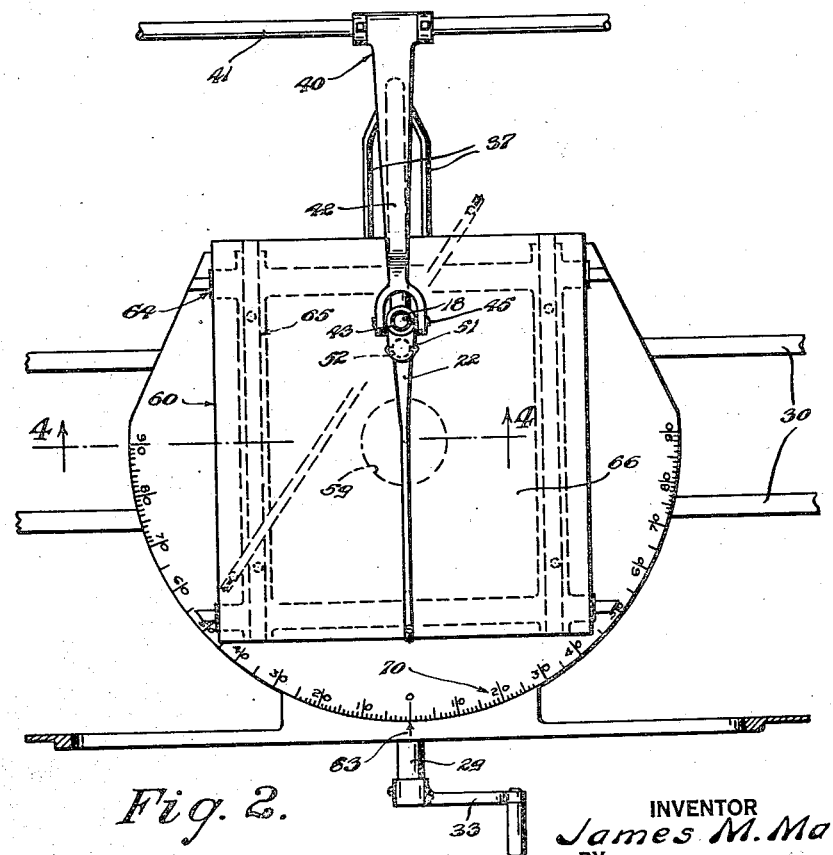
Figure 4:
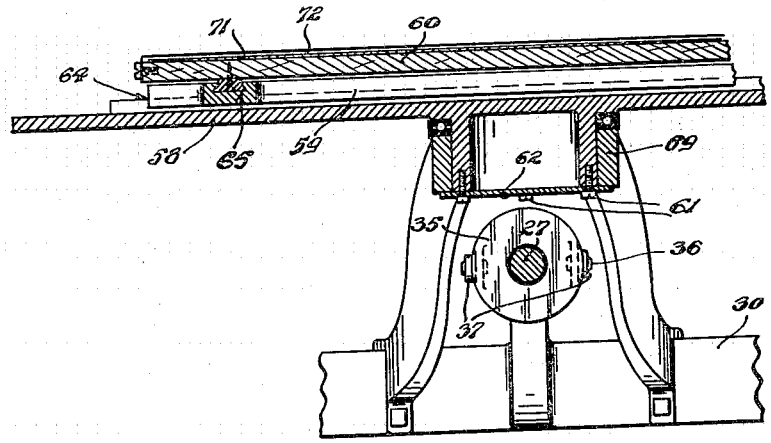
Figure 5:
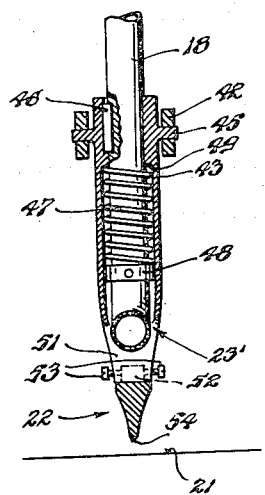
Figure 6:
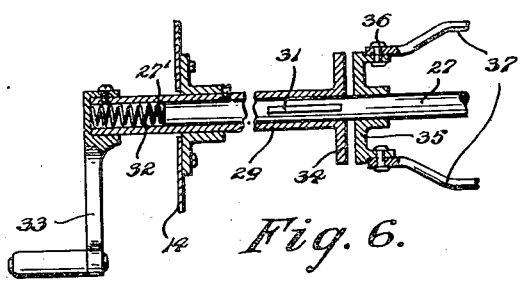

Figure 1 indicates, in a substantial longitudinal vertical section taken through the craft, an elevational view of the apparatus. Fig. 2 is a horizontal section substantially through line 2—2 of Fig. 1, indicating in plan, the chart table. Fig. 3 is a front elevation taken from the cock-pit to indicate structure disclosed through the sight opening of an instrument panel. Fig. 4 is a transverse vertical section on lines 4—4 of Fig. 2 to an enlarged scale. Fig. 5 is a fragmentary transverse vertical section taken through marking apparatus. Fig. 6 is a fragmentary horizontal section through aerial and marker control means; and Fig. 7 indicates in detail plan, the application of the invention to a sectional map such as utilized in the aforesaid chart table.

Reference being had thereto, the numeral 10 represents generally, a conventional air-plane body, parts shown to illustrate the invention comprising a cock-pit and instrument panel 13, 14 respectively.

As illustrated, forward of said cock-pit, I provide a pair of plates 15, 16, respectively secured to a floor and ceiling for the reception within journal boxes 17 therefor of the bearing extremities of a vertically disposed tubular shaft member 18, hereinafter termed the main shaft and which provides, adjacent the floor plate 15, a rectangular frame 19 having a loop aerial 20 desirably carried for the interception of radio waves in transmitting the same, as by a lead A, to a receiving set, not shown.

Said shaft is adaptable to a revoluble activity within a substantial 180° arc, providing in accommodating the same, a pair of elbows 23, 23¹ to a common offset loop 24 substantially midway of its height, the respective horizontal arms being spaced from a chart table and marker 21, 22, in allowing fore and aft movement to the former beyond the axis of rotation of the shaft.

Substantially intermediate the aerial-frame bifurcation and elbow 23, I provide a pair of meshing bevel gears 25, 26, respectively secured to the main shaft and a horizontal control shaft 27, said gear 26 being retained in mesh by the journal box 28 from one of a pair of cross-beams 30. Having reference to said control shaft, as disclosed in Figs. 1 and 6, the opposite end is suitably splined as by a key 31 within the bore of a sleeve 29. Encased thereby in opposing relationship to a sleeve secured crank handle 33 and the shaft end 27¹, I provide a spring 32 in a manner to normally retain the sleeve hub 34 and a loosely mounted disc member 35, hereinafter referred to as the clutch elements, in inoperative spaced relationship, one from the other.

More particularly, said clutch element 35 is pivotally secured as by trunnions 36 to cooperative horizontally spaced apart arms 37 of a link member 38, the opposite end of which engages the depending leg 39 of a bell crank 40, mounted for relative rocking activity upon a rigid shaft 41. The arm 42 of said bell crank is bifurcated to straddle a sleeve member 43, slots 44 of said arm engaging projecting pins 45 for actuating the same.

Particular reference being had to Fig. 5, said member is splined, as by a key 46, to the main shaft 18, a spring 47 acting against a shaft secured collar 48 in opposition to the sleeve hub 49 effecting a normal retention of the afore referred to marker 22, carried by said sleeve, in spaced disposition above the chart table 21.

As illustrated, said sleeve is cut away to adapt the same to a relative deflection over the shaft elbow 23¹, terminating in an apertured socket 51 to receive a stud 52 of the marker. Opposing set screws 53 secure the same to have the marker lie substantially in the plane of the loop aerial. A molding having the underside grooved longitudinally to receive a wick 54 impregnated with a suitable viscous fluid comprises the marker as shown.

In indicating the deviation of said loop aerial and the marker controlled thereby, I have provided a pair of meshing bevel gears 55, 56, the latter actuating through shaft 68, a pointer 57 disposed relative to a gauge on the instrument panel.

From the foregoing, it is believed clear that an operator, by turning control handle 33, actuates through key 31, the shaft 27 to effect rotative movement to bevel gear 26 in actuating, by means of the meshing gear 25, the main shaft 18 and integrally associated loop aerial. By a forward thrust of the handle, sleeve 28 slides on shaft 27 to engage clutch elements 34, 35 to depress the marker wick to the chart table 21, hereinafter described.

Particular reference being had thereto, said chart table, being adaptable to rotary, transverse and longitudinal movement, comprises cooperative superposed floors 58, 59 and 60; said floor 58 providing a centrally disposed depending apertured base mounted within the bore of a bearing 69, the latter being supported as a quadrant upon the cross beams 30. I indicate a retaining flange 62 secured as by bolts 61 to the base.

Angularity gradations 70 gauge the relative deviations of said floor 58 with respect to a lubber mark 63 disposed to the sight opening of the instrument panel.

Floors 59 and 60, as illustrated, comprise, respectively, cooperative transverse and longitudinally disposed tongue and groove elements 64, 65 adapted to relatively free slide activity in the plane of the respective tenon members.

Figure 7:
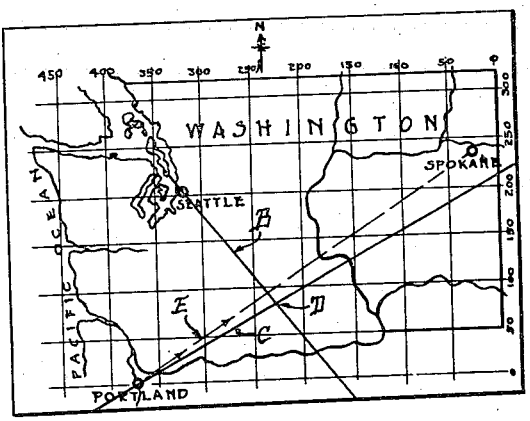

Suitable means in conjunction with said chart table provide a securement upon the face 66 of said floor 60 of a sectional map and superposed celluloid facing 71, 72, an illustrative embodiment of such map being indicated in Fig. 7 of the drawings.

The operation is as follows:

Knowing, in a general way, what region a plane is flying over, the operator selects from a suitable compartment containing a plurality of chart maps, that section over which the plane is known at the moment to be traversing. If the plane is flying in a general east by northeast direction, recourse being had to a compass, operator inserts the map and a suitable celluloid facing to the table in a manner to have the east cardinal sector toward the plane's nose, correcting deviation from true east to east-by-northeast by rotating table floor 58 to approximate, relatively between gradation 70 and lubber mark 63, the compass reading.

Assuming, see Fig. 7, the plane's route to be Portland—Spokane, and the operator desires a bearing, in a manner to correct flight deviation, tail winds and such effecting the same, or to specifically designate the point of travel, where, as in fog, etc., the aviator may be lost. Operator by means of his receiving set, picks up, say, a Seattle broadcasting station, and tunes the aerial by rotating the same through control handle 33 until the maximum volume response is found. At such time, marker wick 54 is in direct alignment to the station, being in the vertical plane of the loop aerial.

Tongue and groove members allow the table to be slid transversely until the map allocation of Seattle is in a plane directly below the line of the marker. Operator leaves the table at such point, noting the loop location through pointer 57, and picks up, say, a Portland broadcasting station, subsequently tuning in the same to the maximum response by adjusting the loop aerial. Noting, through pointer 57, the deviation with respect to the longitudinal line of center of the airplane, operator rapidly swings loop aerial and associated marker to the original station, presses handle 33 to indicate, by wick 54, the reception line B to the celluloid above the map, passing through the station locality. Rapidly returning to the Portland station, the map is slid longitudinally as by tongue and groove members, directly allocating such station below the reception line. A pressure to handle 33 indicates, through wick 54, a line C passing through Portland and intersecting, at a point D removed, the formerly indicated line. The intersecting point D is the plane location. The operator can readily check deviation from the true course, as indicated by broken line E, accommodating for such in the plane's control. The rapidity with which an operator takes his final indications to the map, proper, will determine the accuracy of the chart reading. It is believed evident that the plane must be held to the original compass reading during the taking of the chart reading. One or a plurality of bearings may be taken during the plane's flight, as desired.

The application of the invention, while herein disclosed in its operation with respect to a moving plane, might advantageously be utilized by a plane forced to land in unknown terra, or as readily, for navigating vessels.

While I have illustrated and described the embodiment of the invention as now preferred by me, I do not wish to be taken as confining myself thereto except as limited by the scope of the claims hereto annexed.

What I claim, is:—

1. In apparatus for determining the location of a body, in combination, a pivotal horizontal table, a charted map incorporating the immediate vicinity, means for supporting said map on the table, means for determining an angle embracing a portion of such vicinity and including the location of the body as a vortex, means for revolving said table to position the map for true meridian, and means for sliding the map horizontally of the table along two intersecting vertical planes disposed at a predetermined angle with respect to one another for locating said determined angle relative to like territory charted on the map.

2. Structure as defined in claim 1, means being afforded to prevent revoluble movement of said table in maintaining the map against displacement from its positioned true meridian during slide movement of the same.

3. In apparatus for determining the location of a body, the combination with a charted map incorporating the immediate vicinity of a horizontal table adapted to support the map thereon, means including a revolubly supported receiving aerial supported for movement on a vertical axis for determining an angle embracing a portion of such vicinity and including the location of the body as a vortex, means for locating said map to position the same for true meridian, and means for sliding the map horizontally in vertical intersecting planes disposed at predetermined angles with respect to one another for locating said determined angle relative to like territory charted on the map.

4. In apparatus for determining the location of a body, in combination, a loop aerial mounted to rotate on a substantial vertical axis for determining vertical planes of reception between the body and radio-broadcasting stations, a charted map including the immediate vicinity of the body and incorporating within the map confines two broadcasting stations, a horizontal table adapted to support the map thereon, means for guiding said table for horizontal movement in two planes disposed at a constant angle to one another, and means for positioning said table to locate the map for true meridian, said movement of the map horizontally in two directions only at right angles to one another affording positioning of the map to successively locate the broadcasting points indicated thereon in the actual vertical planes of radio reception between the body and the broadcasting stations without interrupting the positioned true meridian of the map, the intersection of the two indicated planes on the map determining the location of the body.

5. The structure as defined in claim 4, and an ink-impregnated wick normally supported in spaced disposition above the map in the plane of reception of the aerial and revoluble therewith about the axis of rotation of the aerial, and means for depressing said wick over the map to produce a lineal reading of the determined vertical plane of reception.

6. Structure for determining the location of a body comprising, in combination, a charted map including the immediate vicinity of the body and incorporating within the confines of the same two distant points, a support for the map, a rotary mounting for said support, means controlling said rotary movement to position the map supported thereon for true meridian, means for determining a direct line between the body and one of said distant points indicated on the map, guide means for said map accommodating movement of the same on the support to position the map-indicated point in said direct line, means for recording said line on the map to provide a lineal reading through the point, means for determining a direct line between the body and the other of said distant points indicated on the map, guide means for said map accommodating movement of the map along a plane angularly disposed to the direction of said first named map movement to position the last-named point on the map in its determined direct line, and means for recording said last-named line on the map to provide a lineal reading intersecting said first-named lineal reading, the intersection of the determined direct lines indicating the location of the body.

7. Structure for determining the location of a body comprising, in combination, a charted map including the immediate vicinity of the body and incorporating within the confines of the same two distant points, a support for the map, a rotary mounting for said support, means controlling the rotary movement of said support to position the map supported thereon for true meridian, means for determining a direct line between the body and one of said distant points indicated on the map, means guiding said map for horizontal movement along a vertical plane to position the map-indicated point in said direct line, means for determining a direct line between the body and the other of said distant points indicated on the map, and means guiding the map for horizontal movement along a vertical plane angularly disposed to said first named plane of map movement to position the last-named point on the map in its determined direct line, the intersection of the determined direct lines indicating the location of the body.

JAMES M. MACK.